Feb. 14, 1956 D. McNICOLL 2,734,786
ROLLER BEARINGS AND CAGES THEREOF
Filed Oct. 23, 1952 4 Sheets-Sheet 3
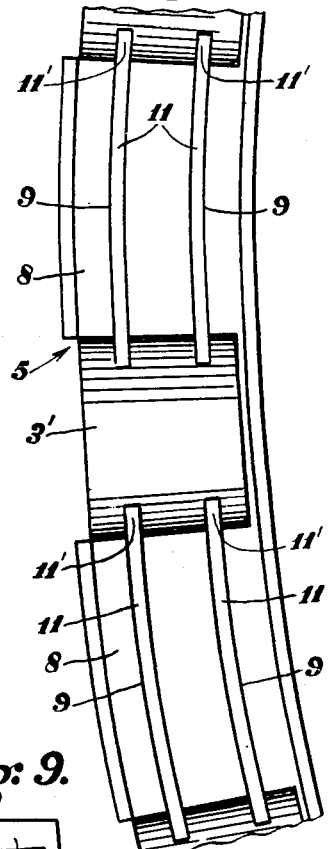
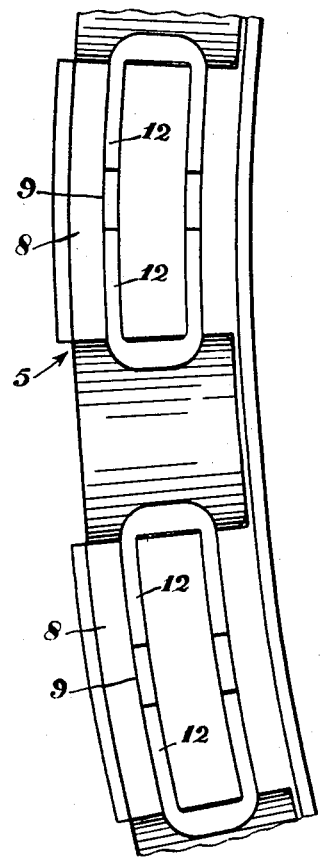
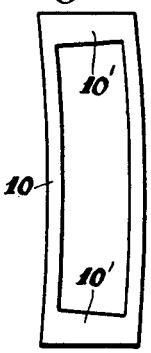
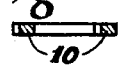
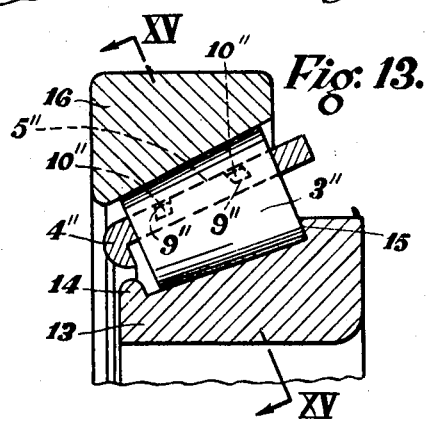
Inventor
David McNicoll
By Richard y Geier
Attorneys

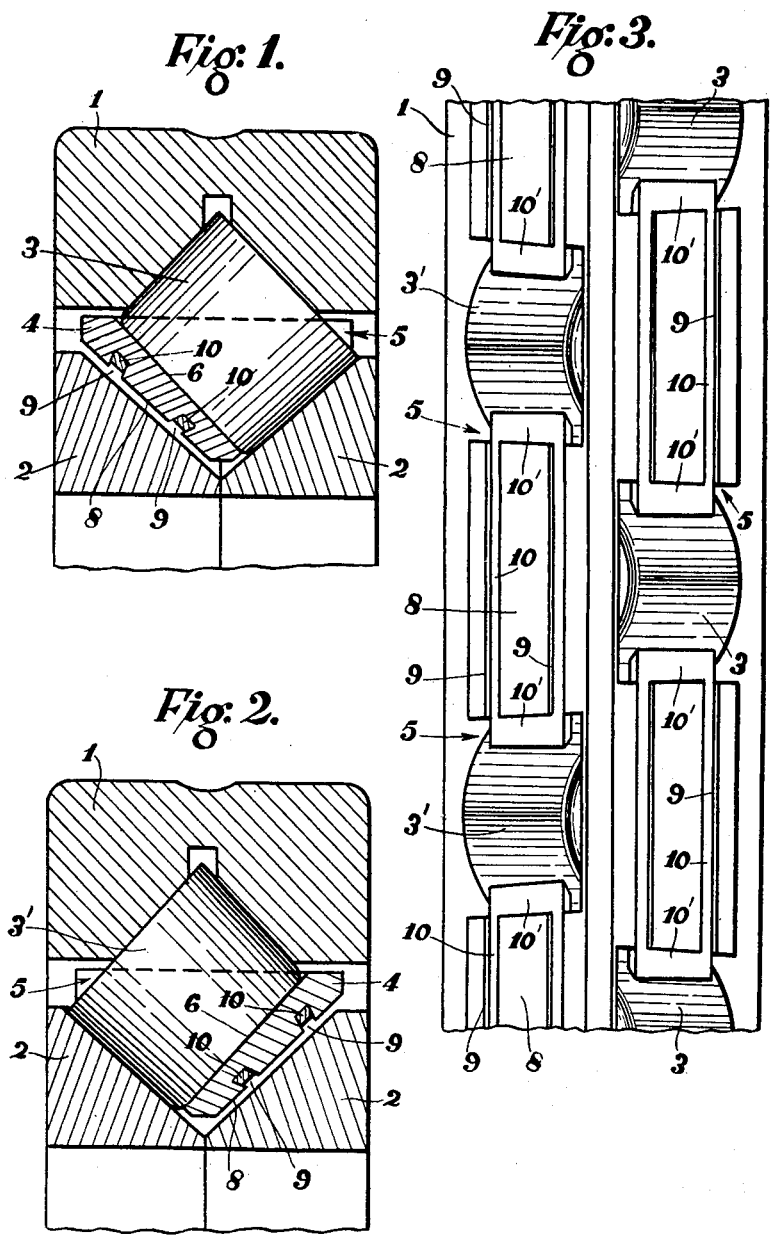

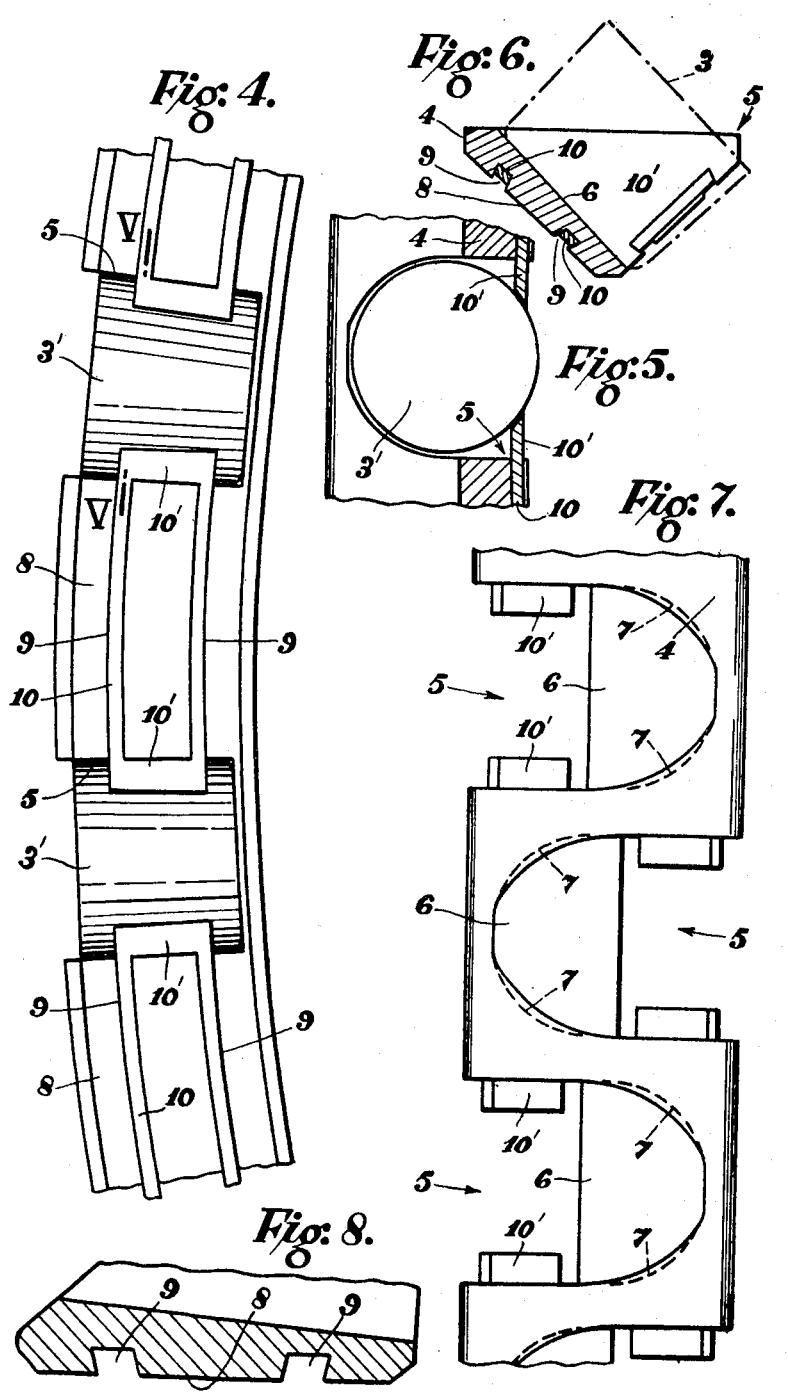

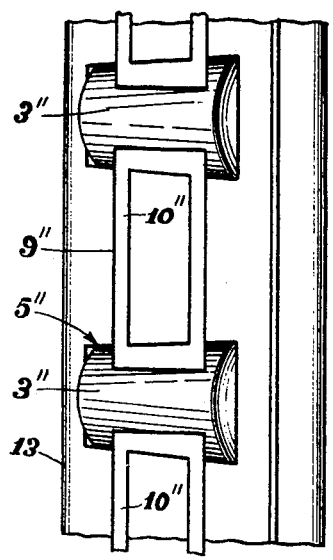
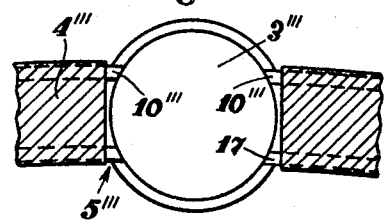
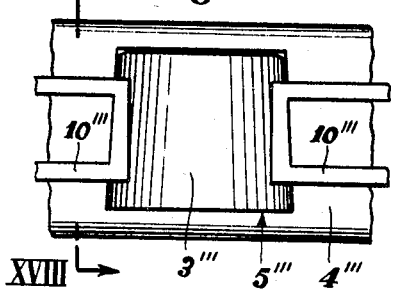
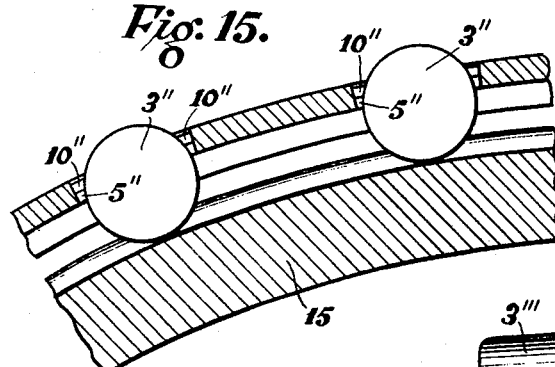
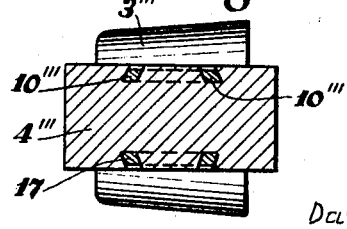

United States Patent Office 2,734,786
Patented Feb. 14, 1956

2,734,786
ROLLER BEARINGS AND CAGES THEREOF

David McNicoll, Aston, Birmingham, England, assignor to British Timken Limited, Birmingham, England, a company of Great Britain Application October 23, 1952, Serial No. 316,393

10 Claims. (Cl. 308—214)

This invention relates to roller bearings and to the cages thereof, said bearings being of the tapered, spherical or parallel roller type, with or without flanges on the inner or outer race member, and the cages consisting of a ring or annular body having roller-receiving pockets or recesses therein.

One of the objects of the present invention is to provide a roller-bearing cage which is simple to produce and which has means for retaining the rollers within the pockets or recesses without recourse to winging or contouring of the sides of the pockets or recesses to make them conform to the peripheries of the rollers.

Another object is to provide a cage which will enable the rollers to be assembled upon or within an inner or outer race having flanges or ribs, and subsequently dismantled, without the need for deforming or damaging the cage.

A further object is to provide a unit assembly of cage and rollers which permits of the rollers being easily assembled and retained within the pockets.

Another object is to provide a self-contained race member, cage and roller assembly in which the rollers are retained in the cage pockets by simple but effective means to enable the assembly to be handled as a unit.

According to the invention, a self-contained roller-bearing assembly consists of a race member, rollers co-operating with a race surface on said member, a cage formed with roller-housing pockets having roller-receiving openings in a peripheral surface of the cage remote from said race surface, and separate roller-retaining members fitted in or to said peripheral surface so that portions of said members project beyond the lands between the pockets and overlap the peripheries of the rollers in the pockets.

Also, according to the invention, in a roller bearing in which the rollers are located in pockets or recesses provided in a cage, the rollers are retained in said pockets or recesses, after being inserted therein, by means of retaining members fitted to the lands between the pockets or recesses so that portions of said members project beyond the lands and overlap the rollers in the pockets.

The invention also includes a self-contained roller and cage assembly for a roller bearing comprising a ring or annular body having rollers housed in open pockets or recesses therein, and separate roller-retaining members fitted in or to the lands between the pockets or recesses so as to overhang said lands and extend partially across the openings of the pockets in order to retain the rollers therein.

Conveniently the retaining members may be fitted and held in grooves provided in the lands between the pockets or recesses of the cage. The said retaining members may be made of wire or strip metal, and they may be in the form of bars or straight lengths, or they may be of rectangular or other loop form, or of U-shape or of any other convenient configuration. When the members have two spaced branches or sides, as when they are of loop form or U-shaped, the said branches or sides may be pressed into grooves which, in the direction of their depth, diverge from one another, so that as the branches or sides are pressed into the grooves, they are stressed or tensioned.

Figure 1 of the accompanying drawings is a cross-section through a cross-roll or X-type of roller bearing, to which the invention is shown applied. This view shows in elevation one of the series of rollers that are inclined in one direction.

Figure 2 is a similar cross-section, but taken through a different part of the bearing to show in elevation one of the series of rollers that are inclined in the other direction.

Figure 3 is an elevation of the interior periphery of a portion of the roller cage and showing rollers retained therein. This view presumes the inner race members to have been removed.

Figure 4 is a side elevation of a portion of the cage and of the rollers therein, as seen in a direction at right-angles to the cage face. In this view the race members are omitted.

Figure 5 is a section on line V—V, Figure 4, with the roller shown in elevation.

Figure 6 is a transverse section through the cage itself, the position taken by one of the rollers being indicated by broken lines.

Figure 7 is a plan view of a portion of the cage without the rollers.

Figure 8 is a cross-section, upon a larger scale, through one side wall of the cage before the roller-retaining means are fitted.

Figure 9 is a plan view of one of the roller-retaining members.

Figure 10 is a cross-sectional view thereof.

Figure 11 is a view similar to Figure 4, but showing a modified form of retaining means.

Figure 12 is a similar view showing another modified form of retaining means.

Figure 13 is a cross-sectional view showing the application of the invention to a single-row orthodox type tapered-roller bearing in which the inner race member has two ribs or flanges.

Figure 14 is a plan view of the roller, cage and inner race-member assembly in this application of the invention.

Figure 15 is a fragmentary circumferential sectional view corresponding to line XV—XV, Figure 13, with the outer race member omitted.

Figure 16 is a side elevation of a portion of a self-contained cage and roller assembly, according to the invention.

Figure 17 is a plan view thereof.

Figure 18 is a cross-section on line XVIII—XVIII, Figure 17.

Referring to Figures 1 to 10 of the drawings, these views show the application of the invention, by way of example, to a roller bearing of the X-type—that is, comprising a row of tapered rollers disposed between inner and outer bearing members 1, 2, each having raceways at an angle to one other and with the axes of certain of the rollers 3 inclined in one direction with respect to the axis of the bearing and with the axes of the other rollers $3^1$ inclined in the opposite direction. The inner bearing member 1 is made in two removable parts, as shown, and the cage 4 which is employed for spacing the rollers may be similar to that described in our application for patent Ser. No. 204,719, now Pat. No. 2,628,137. Thus, the said cage 4 consists of a ring or annular body of substantially triangular shape in cross-section, with the apex portion directed radially inwards towards the axis of the bearing, the ring or body having, in opposite sides, laterally-open pockets or recesses 5 for receiving the individual rollers, the pockets at the one side being in the staggered relation to those at the other side. Each pocket extends obliquely from one inclined face of the ring to the outer periphery thereof, the rear or inner end of each pocket (considered in an axial direction) being closed by the inclined body wall 6 at the other side of the ring. The side walls of the pockets, adjacent the outer cylindrical periphery of the ring, are spheroidally curved inwards towards one another (Figure 7) to produce curved seating lips or surfaces 7 which overlie the running surfaces of the rollers so that, in operation, the cage is supported by the rollers.

In order to prevent the rollers from falling out of the pockets or recesses 5 through the lateral openings thereof in the inclined faces of the cage, there are provided in said faces, that is to say, in the inclined faces of each of the lands 8 between the pockets, two parallel circumferentially-extending deep grooves 9 which are cut in the inclined body walls at an angle to the faces thereof, so as to diverge from one another in the direction of their depth, that is, in a direction away from the inclined face of the cage, as shown clearly in Figures 1, 2, 6, and 8. After assembly of the rollers through the laterally-open sides of the pockets on one side of the bearing, preformed wire or strip or sheet metal clips or retaining members 10 are pressed into the grooves. These retaining members are of rectangular open loop-like form, as shown in Figures 3, 4 and 9, with parallel sides, being endless (as shown) if stamped from sheet metal; or, if made from wire or strip, having their ends abutting or somewhat spaced. The said members are curved longitudinally to conform to the grooves 9 and are of a length somewhat greater than the circumferential length of the respective lands 8 into which they are to be fitted.

The parallel sides of the retaining members 10 are pressed into the parallel grooves 9 with the closed ends $10^1$ of members extending from the ends of the lands and overhanging the pockets 5. These end portions $10^1$ may be bevelled on their undersides to conform generally to the contour of the rollers. As the members 10 are fully pushed into the grooves, the diverging relation of the latter causes the sides of the members to separate further and thus the metal is stressed and elongated, thereby causing the members to be self-retaining in position at the bottom of the grooves. When thus in place the retaining members lie below the surface of the cage, and their projecting ends overlie the peripheral running surfaces of the rollers and thus maintain the latter within the pockets. After assembly at the one side of the bearing, the latter may be turned over and the opposite side assembled in the same way.

A self-contained assembly of outer race member, cage and rollers is thus produced, which can be handled as a unit.

If it is desired to remove the rollers this can be readily done by prising the retaining members 10 out of their grooves 9, new retaining members being inserted when the rollers are replaced.

Instead of the grooves 9 being cut in diverging relation, they may be parallel throughout their depth, and the retaining members 10 may be secured in the grooves by any convenient means, such as by caulking the edges of the grooves so as to overlap the members.

Also, as shown in Figure 11, instead of the retaining members being of closed loop form, they may consist of two plain strips or bars 11, 11, curved laterally as shown, and fixed in grooves 9 in the cage lands 8 by caulking or the like, and having extended end portions $11^1$ which overhang the pockets 5 to retain the rollers $3^1$ therein. Or, as shown in Figure 12, the retaining members 12 may be of U-shape (or other convenient form) fitted in grooves 9 in the cage lands 8 so that their closed end portions overhang the pockets 5 and the rollers therein.

In the form shown there is a separate U-member overhanging each pocket edge, but long U-shaped members could be employed, the closed end overhanging one pocket and the free ends of the branches overhanging another pocket.

Figures 13 to 15 show the application of the invention to a single-row orthodox type tapered-roller bearing of conventional form having an inner race member 13 provided with ribs or flanges 14, 15, opposed to the ends of the rollers $3^{11}$. In this application the cage $4^{11}$ has pockets or apertures $5^{11}$ into which the rollers $3^{11}$ are assembled from the periphery of the cage which is remote from the inner race member 13 having the ribs or flanges 14, 15, and the rollers are then retained in the pockets by retaining members $10^{11}$, such as hereinbefore described, which are pressed into grooves $9^{11}$ in said cage periphery so that their ends overhang or overlap the sides of the pockets. Thus, a self-contained race member, cage and rollers is produced. The assembly of the rollers, and subsequent dismantling if required, can thus be effected without need for deforming or damaging the cage. If the outer race members 16, instead of the inner race member, is provided with ribs or flanges, then the retaining members $10^{11}$ would be fitted in grooves in the other side of the cage, to make the outer member, the cage and the rollers a self-contained unit.

A self-contained cage and roller assembly, which can be handled as a unit without the rollers falling out, can be produced, as in Figures 16 to 18, by applying roller-retaining members $10^{111}$, as herein described, to at least one periphery of a cage ring $4^{111}$ having pockets or apertures $5^{111}$ extending from the inner to the outer periphery, and in providing any suitable means (which may be another set of said retaining members), as indicated at 17 (Figures 16 and 18), at the other periphery to prevent the rollers $3^{111}$ from falling out of the pockets at that periphery.

I claim:

1. An X-type roller bearing comprising inner and outer race members each provided with two race surfaces at an angle to one another, a cage ring of substantially triangular section with roller-receiving pockets separated by peripheral lands in opposite sides, rollers located in the pockets so as to co-operate with opposed race surfaces on the inner and outer race members and so that the rollers in the pockets at one side of the cage have their axes inclined in one direction whereas those in the pockets at the other side of the cage have their axes inclined in the opposite direction, and separate retaining members fitted and removably held in grooves provided in said lands between the pockets in the two side faces of the cage so that the said retainer members do not project from said lands and so that portions of said members extend beyond said lands and overlap the rollers in the pockets, thereby making the cage, the rollers and one of the race members a self-contained unit assembly.

2. A self-contained roller-bearing assemby comprising a race member, rollers co-operating with a race surface on said member, a cage formed with roller-housing pockets having roller-receiving openings in a peripheral surface of the cage remote from said race surface, said openings being separated by peripheral lands, and separate roller-retaining members fitted and removably held in grooves provided in said lands between the pockets so as not to project from the faces of the lands but projecting beyond said lands and overlapping the peripheries of the rollers in the pockets.

3. A self-contained roller-bearing assembly comprising a race member, rollers co-operating with a race surface on said member, a cage formed with roller-housing pockets separated by peripheral lands and having roller-receiving openings in a peripheral surface of the cage remote from said race surface, and separate roller-retaining members having spaced branches which are pressed into grooves provided in the lands between the pockets and which, in the direction of their depth, diverge from one another, so that as the branches are pressed into the grooves they are stressed; said roller-retaining members projecting beyond said lands and overlapping the peripheries of the rollers in the pockets.

4. A self-contained roller and cage assembly for a roller bearing comprising a ring having rollers housed in open pockets therein which are separated by peripheral lands, and separate roller-retaining members having spaced branches which are pressed into grooves provided in the lands between the pockets and which, in the direction of their depth, diverge from one another, so that as the branches are pressed into the grooves they are stressed; said roller-retaining members projecting beyond said lands and overlapping the peripheries of the rollers in the pockets.

5. An X-type roller bearing comprising inner and outer race members each provided with two race surfaces at an angle to one another, a cage ring of substantially triangular section with roller-receiving pockets in opposite sides, the pockets being separated by peripheral lands, rollers located in the pockets so as to co-operate with opposed race surfaces on the inner and outer race members and so that the rollers in the pockets at one side of the cage have their axes inclined in one direction whereas those in the pockets at the other side of the cage have their axes inclined in the opposite direction, and separate retaining members having spaced branches which are pressed into grooves provided in said lands between the pockets and which, in the direction of their depth, diverge from one another, so that as the branches are pressed into the grooves they are stressed; the transverse end portions of said roller-retaining members extending beyond said lands and overlapping the rollers in the pockets, thereby making the cage, the rollers and one of the race members a self-contained unit assembly.

6. A self-contained roller-bearing assembly comprising a race member, rollers co-operating with a race surface on said member, a cage formed with roller-housing pockets separated by peripheral lands and forming roller-receiving openings in a peripheral surface of the cage remote from said race surface and separate roller-retaining members of loop form having spaced parallel side bars which are pressed into open-ended grooves provided in the lands between the pockets and which, in the direction of their depth, diverge from one another, so that as the side bars are pressed into the grooves they are stressed; the transverse end portions of said roller-retaining members projecting beyond said lands and overlapping the peripheries of the rollers in the pockets.

7. A self-contained roller and cage assembly for a roller bearing comprising a ring having rollers housed in open pockets therein, the pockets being separated by peripheral lands, and separate roller-retaining members of loop form having spaced parallel side bars which are pressed into open-ended grooves provided in said lands between the pockets and which, in the direction of their depth, diverge from one another, so that as the side bars are pressed into the grooves they are stressed; the transverse end portions of the retaining members projecting beyond said lands and overlapping the peripheries of the rollers in the pockets.

8. An X-type roller bearing comprising inner and outer race members each provided with two race surfaces at an angle to one another, a cage ring of substantially triangular section with roller-receiving pockets in opposite sides and separated by peripheral lands, rollers located in the pockets so as to co-operate with opposed race surfaces on the inner and outer race members and so that the rollers in the pockets at one side of the cage have their axes inclined in one direction whereas those in the pockets at the other side of the cage have their axes inclined in the opposite direction, and separate retaining members of loop form having spaced parallel side bars which are pressed into open-ended grooves provided in said lands between the pockets and which, in the direction of their depth, diverge from one another, so that as the side bars are pressed into the grooves they are stressed; the transverse end portions of said roller-retaining members extending beyond said lands and overlapping the rollers in the pockets, thereby making the cage, the rollers and one of the race members a self-contained unit assembly.

9. A cage for roller bearings having rollers, the cage comprising a body, said body having formed therein spaced pockets for the roller bearings, the pockets being separated by lands, each land having formed therein two spaced parallel grooves intermediate successive pockets, at least one substantially rigid roller-retaining member for the grooves, means for removably securing said roller-retaining member in the grooves, said means substantially preventing oil churning and the ends of said retaining member projecting beyond each end of the land and overlapping the periphery of the rollers in successive pockets.

10. A self-contained roller-bearing assembly comprising a race member, rollers co-operating with a race surface on said member, a cage for said rollers, said cage having formed therein spaced roller-housing pockets, said pockets having roller-receiving openings formed in the surface of the cage remote from said race surface, said roller receiving openings being separated by lands, each land having formed therein at least one groove intermediate successive roller-receiving openings, a substantially rigid roller-retaining member for the groove, and means for removably securing said roller-retaining member in the groove, said means creating minimum oil churning, and each end of said retaining member projecting beyond the land and overlapping the periphery of the rollers in successive pockets.

References Cited in the file of this patent

UNITED STATES PATENTS

| | | |
|---|---|---|
| 606,040 | Truba | June 21, 1898 |
| 997,573 | Michaud | July 11, 1911 |
| 2,359,120 | Kilayin | Sept. 26, 1944 |
| 2,399,669 | Frauenthal | May 7, 1946 |
| 2,628,137 | Ashton | Feb. 10, 1953 |